(12) United States Patent
Nakai et al.

(10) Patent No.: US 8,911,531 B2
(45) Date of Patent: Dec. 16, 2014

(54) HYDROMETALLURGICAL PLANT OF NICKEL LATERITE ORE AND OPERATION METHOD THEREOF

(75) Inventors: Osamu Nakai, Tokyo (JP); Toru Kitazaki, Tokyo (JP); Shinichi Heguri, Tokyo (JP); Yoshitomo Ozaki, Tokyo (JP); Keisuke Shibayama, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 298 days.

(21) Appl. No.: 13/394,202

(22) PCT Filed: Oct. 1, 2010

(86) PCT No.: PCT/JP2010/067212
§ 371 (c)(1),
(2), (4) Date: Mar. 5, 2012

(87) PCT Pub. No.: WO2011/048927
PCT Pub. Date: Apr. 28, 2011

(65) Prior Publication Data
US 2012/0161374 A1    Jun. 28, 2012

(30) Foreign Application Priority Data

Oct. 19, 2009   (JP) .................................. 2009-240230

(51) Int. Cl.
*C22B 3/04* (2006.01)
*C22B 3/00* (2006.01)
*C22B 3/02* (2006.01)

(52) U.S. Cl.
CPC . *C22B 23/04* (2013.01); *C22B 3/02* (2013.01); *C22B 23/0407* (2013.01)
USPC .................. 75/738; 266/44; 266/114; 75/425

(58) Field of Classification Search
CPC .. C22B 23/0461; C22B 23/043; C22B 19/26; C22B 15/0093
USPC .............................. 266/44, 114; 75/425, 738
See application file for complete search history.

(56) References Cited

U.S. PATENT DOCUMENTS

| 3,751,554 | A | * | 8/1973 | Bare et al. ....................... 423/32 |
| 4,195,986 | A | * | 4/1980 | Schulz et al. ..................... 75/425 |
| 5,976,218 | A | * | 11/1999 | Virnig et al. .................... 75/738 |
| 7,964,165 | B2 | * | 6/2011 | Nakai et al. .................... 423/101 |
| 2005/0265910 | A1 | * | 12/2005 | Kobayashi et al. ........... 423/140 |

FOREIGN PATENT DOCUMENTS

| JP | 61-011509 A | 1/1986 |
| JP | 63-146110 A | 6/1988 |

(Continued)

OTHER PUBLICATIONS

International Search Report for PCT/JP2010/067212, dated Dec. 14, 2010.

*Primary Examiner* — Scott Kastler
(74) *Attorney, Agent, or Firm* — Westerman, Hatori, Daniels & Adrian, LLP

(57) ABSTRACT

A hydrometallurgical plant for nickel laterite ore extraction having a plurality of treatment facility lines wherein the plant is capable of minimizing a decrease in throughput when line failure occurs and efficiently restoring normal operation status Each line of the treatment facility includes a pretreatment step, a leaching step, a solid-liquid separation step, a neutralization step, a zinc removal step, a sulfurization step and a detoxification step. The lines are coupled by pipelines, each having a valve, installed after the solid-liquid separation step for sending a liquid from the solid-liquid separation step to the neutralization step in each line and/or after the sulfurization step for sending a liquid from the sulfurization step to the detoxification step in each line.

18 Claims, 3 Drawing Sheets

(56) References Cited

FOREIGN PATENT DOCUMENTS

| | | |
|---|---|---|
| JP | 08-318453 A | 12/1996 |
| JP | 10-230328 A | 9/1998 |
| JP | 2005-322762 A | 11/2005 |
| JP | 2005-350766 A | 12/2005 |
| JP | 2006-252700 A | 9/2006 |
| JP | 2008-231470 A | 10/2008 |
| JP | 2009-173967 A | 8/2009 |

* cited by examiner

Fig. 3   --PRIOR ART--
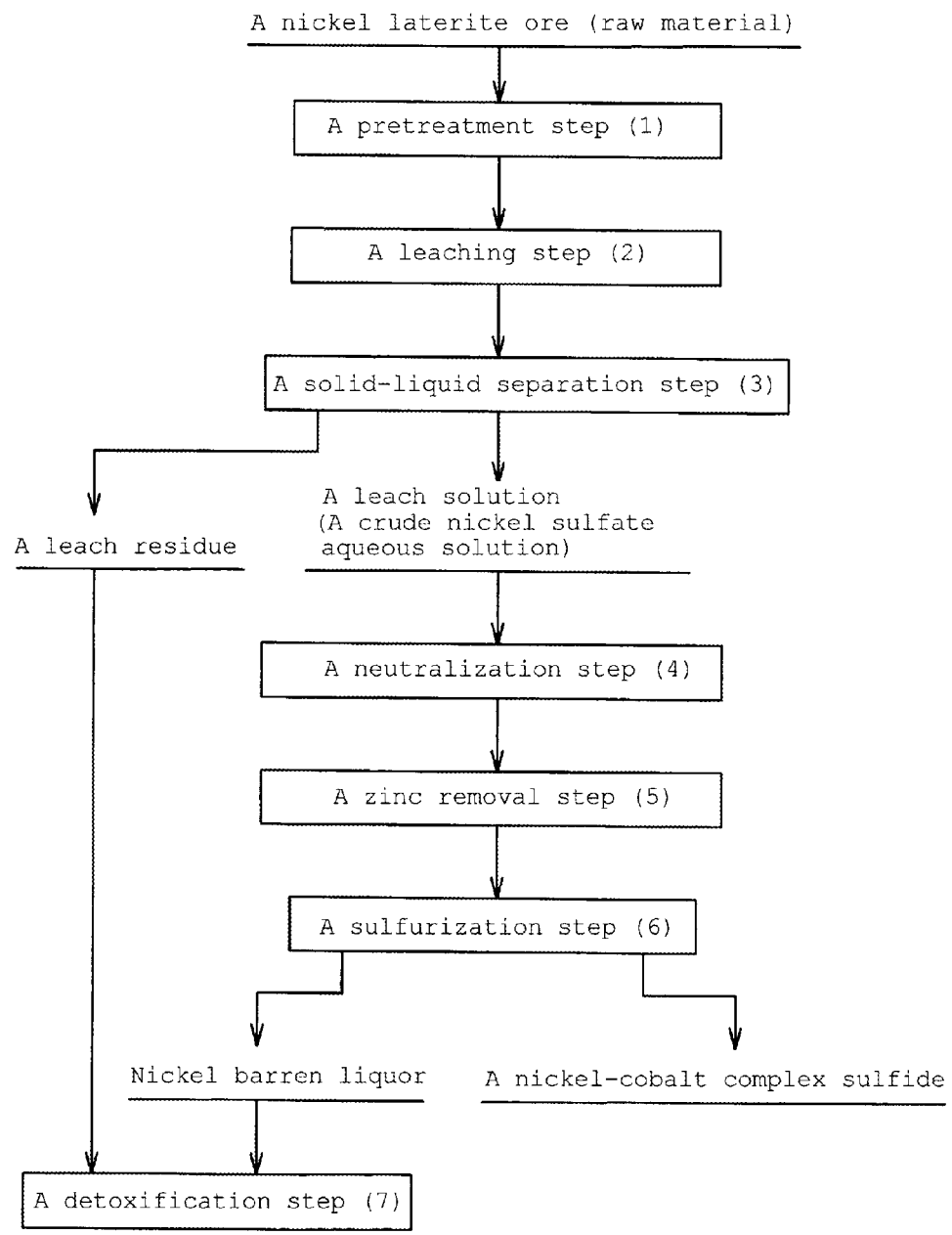

HYDROMETALLURGICAL PLANT OF NICKEL LATERITE ORE AND OPERATION METHOD THEREOF

TECHNICAL FIELD

The present invention relates to a hydrometallurgical plant of a nickel laterite ore and an operation method thereof, and in more detail the present invention relates to, in a hydrometallurgical plant of a nickel laterite ore having a plurality of lines of treatment facilities, the hydrometallurgical plant of the nickel laterite ore which is, even when such a trouble as operation of apart of said treatment facilities should be stopped (hereafter, it may be referred to simply as "serious trouble") will occur, capable of minimizing decrease in throughput caused by this, and restoring a normal operation state early, after eliminating the serious trouble, and an operation method thereof.

BACKGROUND ART

In recent years, as the hydrometallurgical plant of the nickel laterite ore, High Pressure Acid Leach using sulfuric acid has been attracted the attention. This method does not include pyro-type processing steps such as drying and a roasting step, and is composed of consistent wet-type processes, therefore advantageous in view of energy and cost, as well as in capability of obtaining a nickel-cobalt mixed sulfide with an enhanced nickel content of up to about 50 to 60% by weight.

The High Pressure Acid Leach to obtain the above nickel-cobalt mixed sulfide includes, for example, as exemplified in FIG. 3, a pretreatment step (1) for pulverizing and classifying the nickel laterite ore to make slurry; a leaching step (2) for obtaining leach slurry, by adding sulfuric acid to the resultant slurry to be subjected to High Temperature High Pressure Acid Leach at 220 to 280° C. under stirring; a solid-liquid separation step (3) for obtaining a leach solution containing nickel and cobalt (a crude nickel sulfate aqueous solution) and a leach residue, by solid-liquid separation of the leach slurry; a neutralization step (4) for neutralizing the resultant crude nickel sulfate aqueous solution; a zinc removal step (5) for precipitation removing zinc as zinc sulfate, by adding hydrogen sulfide gas to the crude nickel sulfate aqueous solution neutralized; a sulfurization step (6) for obtaining the nickel-cobalt mixed sulfide and nickel barren liquor, by adding hydrogen sulfide gas to the resultant zinc removed final solution; and a detoxification step (7) to detoxify the leach residue generating in the solid-liquid separation step (3) and the nickel barren liquor generating in the sulfurization step (6) (for example, refer to Patent Literature 1, page 2).

The hydrometallurgical plant of nickel laterite ore is composed of a boiler for obtaining steam to control reaction temperature of each step, a hydrogen sulfide manufacturing equipment for producing hydrogen sulfide gas to be used mainly in the steps (5) and (6), and still more a water facility, a power facility and a piping facility such as liquid sending pipes for coupling sequentially each step and the like, other than facilities required in the above-mentioned steps.

In operation of such a hydrometallurgical plant, because major intermediate products are in a liquid or slurry state, it is general that when supply of steam is stopped caused by a serious trouble of the boiler, the whole plant is stopped fundamentally, and after elimination of the serious trouble, or after repair, the whole plant is started-up again. Therefore, in order to operate the whole plant continuously and in high rate of operation, it is necessary to operate the facilities of each step or other facilities in a state of no trouble always.

Accordingly, in a practical plant, operation is made under constant load as much as possible to avoid load variation. In addition, prevention of unexpected occurrence of serious troubles is strived for, by increasing frequency of a scheduled shut-down, or extending the shut-down period to inspect the facility or perform repair as needed.

In addition, provided that, caused by a trouble generated at somewhere of the process, generation of such a state that load should be temporarily decreased (such a case is called "ramp down") at the relevant and subsequent steps is unavoidable, usually, an emergency storage tank is installed, so as not to decrease throughput in such a case.

In this way, by keeping load as it is or decreasing load of the steps before the step where troubles occurred, and storing process liquid becoming excess in the emergency storage tank, and after the trouble is eliminated, load of the steps is increased (such a case is called "ramp up") so as to treat the process liquid stored in the emergency storage tank repeatedly along with usual load, attainment of processing target amount per quarter term or annual term becomes possible.

However, such an emergency evacuation-type response is effective usually when time required in restore is within 1 shift (8 hours), although depending on size of the emergency storage tank, and when it is over that time, process liquid will be stored in the emergency storage tank up to a limitation level, resulting in inevitable operation stop.

By the way, as one of the serious troubles easily occurring in the pretreatment step (1) in a real plant, such a problem has been pointed out that in pulverization and classification of the nickel laterite ore mined, using a drum washer composed of a drum and a trommel in a coupled state, the nickel laterite ore short passes in the trommel, and is carried out to outside the system, and thus predetermined operation result cannot be obtained.

On the other hand, there has been proposed a method for preventing the trouble from occurring, by forming a protrusion having nearly rectangular cross-section shape on a circumference and satisfying specific requirements, as row of protrusion arranged in an interval of about 4 times sieve mesh size of the trommel, on said same circumference which becomes a perpendicular cross-section to a rotating axis of the trommel, at the inner face of the trommel of the drum washer composed of the drum and the trammel in coupling (refer to Patent Literature 2, pages 1 and 2).

In addition, as one of the serious troubles easily occurring in the sulfurization step (6), such a problem has been pointed out that in the step (6), the nickel-cobalt mixed sulfide generated adheres at the inner face of a reactor and grows as a scale, which impairs function of an facility or results in destruction thereof.

On the other hand, there has been proposed a method for preventing the scale from growing, by circulating use of nickel sulfide as a seed crystal, in the sulfurization step (6), in an amount equivalent to 4 to 6 times amount of nickel in the zinc removed final solution from the zinc removal step (5) (refer to Patent Literature 3, pages 1 and 2).

However, in the hydrometallurgical plant of the nickel laterite ore, because various troubles occur frequently taking the above troubles as representative examples, caused by such a process specific reason that hard ore particles are used as slurry, or the nickel-cobalt mixed sulfide is formed which is easy to adhere at the inner face of the reactor, it is general that operation rate of a real plant is not so high.

In recent years, there have been strong needs to increase production amount of the nickel-cobalt mixed sulfide, by increasing the throughput of the nickel laterite ore. To satisfy this requirement, it has been performed to install a plurality of lines of the treatment facilities of the steps (1) to (7). However, even when a plurality of lines are installed, because the above trouble occurs at each line in similar frequency, for example, in the case of two lines, not only merit of the two-line setting is not attained, but also there may be the case where even processing capacity of full operation of one line cannot be satisfied.

Under such a situation, it has been required early establishment of the hydrometallurgical plant of the nickel laterite ore which is, even when the serious trouble will occur, capable of minimizing influence thereof, and restoring a normal operation state early, after eliminating the serious trouble, and an operation method thereof.

CITATION LIST

Patent Literature

Patent Literature 1: JP-A-2005-350766, Page 2
Patent Literature 2: JP-A-2009-173967, Pages 1 and 2
Patent Literature 3: JP-A-2008-231470, Pages 1 and 2

SUMMARY OF INVENTION

Technical Problem

In view of the problems of the above conventional technology, it is an object of the present invention to provide, in a hydrometallurgical plant of a nickel laterite ore, having a plurality of lines of treatment facilities, the hydrometallurgical plant of the nickel laterite ore which is, even when the serious trouble will occur, capable of minimizing decrease in throughput caused by this, and restoring a normal operation state early, after eliminating the serious trouble, and an operation method thereof.

Solution to Problem

The present inventors have studied various investigations to solve the problems and, as a result, found that the above problems can be solved by correlating a plurality of lines of the treatment facilities as a specific structure respectively, and have thus completed the present invention.

That is, according to a first aspect of the present invention, there is provided the hydrometallurgical plant of the nickel laterite ore comprising two or more lines of a series of treatment facilities composed of a pretreatment step, a leaching step, a solid-liquid separation step, a neutralization step, a zinc removal step, a sulfurization step and a detoxification step, characterized in that the lines are coupled therebetween by installing a coupling pipeline having a valve between a liquid sending pipeline from the solid-liquid separation step to the neutralization step in each line and/or between a liquid sending pipeline from the sulfurization step to the detoxification step in each line.

In addition, according to a second aspect of the present invention, there is provided, in the first aspect, the hydrometallurgical plant of the nickel laterite ore, characterized in that the two or more lines of treatment facilities have about the same processing capacity respectively.

In addition, according to a third aspect of the present invention, there is provided, in the first aspect, the hydrometallurgical plant of the nickel laterite ore, characterized in that number of the lines is 2 lines.

In addition, according to a fourth aspect of the present invention, there is provided, in the first aspect, the hydrometallurgical plant of the nickel laterite ore, characterized in that the valve is a control valve.

In addition, according to a fifth aspect of the present invention, there is provided an operation method for the hydrometallurgical plant of nickel laterite ore, characterized by using the hydrometallurgical plant of the nickel laterite ore according to any of the first to the forth aspects.

Advantageous Effects of Invention

The hydrometallurgical plant of the present invention has two or more lines of a series of treatment facilities composed of a pretreatment step, a leaching step, a solid-liquid separation step, a neutralization step, a zinc removal step, a sulfurization step and a detoxification step, wherein the lines are coupled therebetween by installing a coupling pipeline having a valve between a liquid sending pipeline from the solid-liquid separation step to the neutralization step in each line and/or between a liquid sending pipeline from the sulfurization step to the detoxification step in each line.

Accordingly, for example, in the case of two lines, even in the case where a serious trouble will occur at one section among the pretreatment step, the leaching step and the solid-liquid separation step (hereafter, they may be referred to as "step region A" altogether) in the first line, and operation of this step region A should be stopped, by increasing throughput of other line to increase production of a crude nickel sulfide solution, and treating at least the increment of the crude nickel sulfide solution at the neutralization step or subsequent steps where the trouble of the first line does not occur, operation of facilities at or subsequent to the neutralization step can be continued.

In addition, for example, in the case where a trouble will occur at one section in the "step region A" of the first line, and at one section in the neutralization step the second line, the zinc removal step and the sulfurization step (hereafter, they may be referred to as "step region B" altogether), and operation of this step regions A and B should be stopped, by adjusting valve opening degree of the coupling pipeline, as for the "step region A" of the second line, the "step region B" of the first line, and the detoxification step of the first line and the second line (hereafter, the detoxification step may be referred to as "step region C"), continued operation of minimally one line becomes possible.

Therefore, according to the present invention, decrease in throughput, caused by the serious trouble and subsequent operation stop, can be minimized.

Still more, after the serious trouble is eliminated, by starting up only the step which operation was stopped, the first line can be restored to a normal operation state as it is, therefore, as compared with a conventional method wherein operation of the whole facilities of the line where the serious trouble occurred are stopped and the whole steps are started up after elimination of the serious trouble, man-power required for step start-up can be reduced by half or less.

Therefore, the present invention is optimal as the hydrometallurgical plant of the nickel laterite ore handling slurry containing hard particles, or the nickel-cobalt mixed sulfide easy to adhere at the facility surface, or also as an operation method thereof, and thus industrial effect thereof is large.

BRIEF DESCRIPTION OF DRAWINGS

FIG. 3 is a drawing exemplifying a schematic step of the High Pressure Acid Leach.

DESCRIPTION OF EMBODIMENTS

Explanation will be given below separately on the hydrometallurgical plant of the nickel laterite ore of the present invention, and an operation method in the case where a serious trouble occurred.

1. The Hydrometallurgical Plant of the Nickel Laterite Ore

The hydrometallurgical plant of the present invention is the one having two or more lines of a series of treatment facilities composed of a pretreatment step, a leaching step, a solid-liquid separation step, a neutralization step, a zinc removal step, a sulfurization step and a detoxification step. It should be noted that although there are many items to be considered such as mining possible years of the nickel laterite ore, supplying capability of water indispensible in operation, and room for plant site and the like, if these conditions are allowed, it is preferable that respective line has the same degree of processing capacity.

Reason for that is, since, by having the same degree of processing capacity, operation and handling manuals in practical operation in each separate facility may be practically the same, although for separate lines, education cost for workers can be reduced, careless miss and human error caused by assuming wrong processing capacity in other line can be reduced, as well as combination of working system of workers can have room.

Explanation will be given below on the present invention using the case of two lines for easy understanding.

Figure 1:
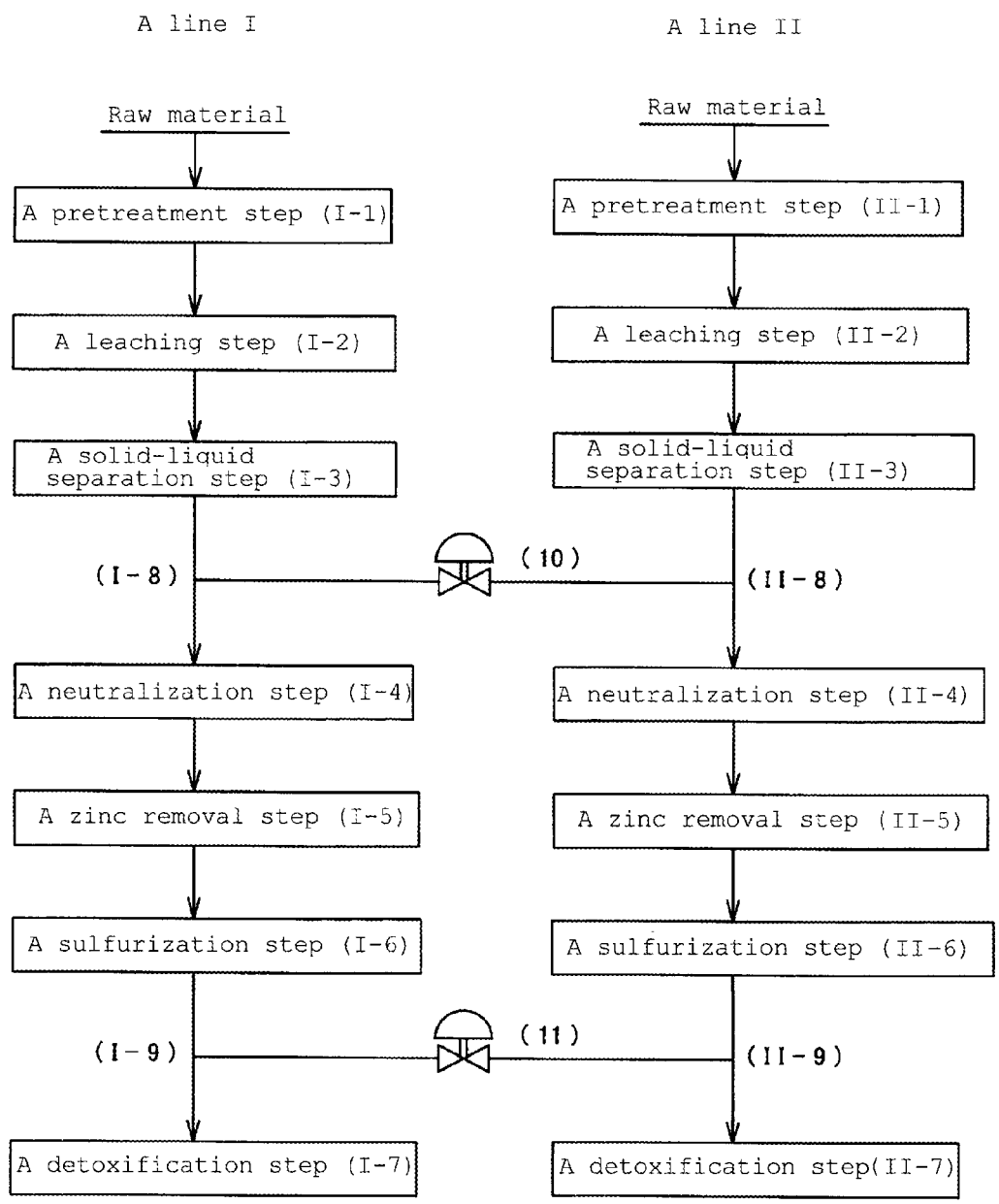
FIG. 1 is a schematic step drawing exemplifying a two line-type hydrometallurgical plant of the present invention.

FIG. 1 shows a schematic step drawing of a two line-type hydrometallurgical plant.

As is understood from FIG. 1, treatment facilities (I, II) of two lines include, as described above, respectively, a pretreatment step (I-1, II-1) for pulverizing and classifying the nickel laterite ore to make slurry; a leaching step (I-2, II-2) for obtaining leach slurry, by adding sulfuric acid to the resultant slurry to be subjected to High Temperature High Pressure Acid Leach at 220 to 280° C. under stirring; a solid-liquid separation step (I-3, II-3) for obtaining a leach solution containing nickel and cobalt (a crude nickel sulfate aqueous solution) and a leach residue, by solid-liquid separation of the leach slurry; a neutralization step (I-4, II-4) for neutralizing the resultant crude nickel sulfate aqueous solution; a zinc removal step (I-5, II-5) for precipitation removing zinc as zinc sulfate, by adding hydrogen sulfide gas to the crude nickel sulfate aqueous solution neutralized; a sulfurization step (I-6, II-6) for obtaining the nickel-cobalt mixed sulfide and nickel barren liquor, by adding hydrogen sulfide gas to the resultant zinc removed final solution; and a detoxification step (I-7, II-7) to detoxify the leach residue generating in the solid-liquid separation step (I-3, II-3) and the nickel barren liquor generating in the sulfurization step (I-6, II-6).

And, there is installed the coupling pipelines (10, 11) having a valve are installed between a liquid sending pipeline (I-8) from the solid-liquid separation step (I-3) to the neutralization step (I-4) in the line I, and a liquid sending pipeline (II-8) from the solid-liquid separation step (II-3) to the neutralization step (II-4) in the line II and/or between a liquid sending pipeline (I-9) from the sulfurization step (I-6) to the detoxification step (I-7) in the line I, and a liquid sending pipeline (II-9) from the sulfurization step (II-6) to the detoxification step (II-7) in the line II.

Reason for setting a position to install the coupling pipelines (10) between a liquid sending pipeline (I-8) from the solid-liquid separation step (I-3) to the neutralization step (I-4) in the line I, and a liquid sending pipeline (II-8) from the solid-liquid separation step (II-3) to the neutralization step (II-4)) is as follows.

That is, it is because, in "the step region A" composed of the pretreatment step (I-1, II-1), the leaching step (I-2, II-2) and the solid-liquid separation step (I-3, II-3), the crude nickel sulfate aqueous solution is produced by particle size adjustment or slurry making of the oxide ore as pretreatment of the nickel laterite ore, and raising temperature of slurry obtained by High Pressure Acid Leach using a heater, or leaching of slurry with sulfuric acid in an autoclave, or temperature decreasing of slurry, still more solid-liquid separation of leach slurry obtained by the following solid-liquid separation of a counter flow type; and to operate these steps, operation of a steam boiler or power generation facility is indispensible and common as a subsidiary facility of the plant, and the one to be sent from the solid-liquid separation step (I-3, II-3) to the next step is easy to be transferred, and the crude nickel sulfide aqueous solution not containing the reached residue is obtained.

In addition, reason for installing the coupling pipelines (11) between a liquid sending pipeline (I-9) from the sulfurization step (I-6) to the detoxification step (I-7) in the line I, and a liquid sending pipeline (II-9) from the sulfurization step (II-6) to the detoxification step (II-7) in the line II) is as follows.

That is, in the "step region B" composed of the neutralization step (I-4, II-4), the zinc removal step (I-5, II-5) and the sulfurization step (I-6, II-6), the nickel-cobalt mixed sulfide as a product and the nickel barren liquor are obtained, by obtaining a neutralized solution by adding a neutralizing agent into the resultant crude nickel sulfide aqueous solution, for neutralization, followed by adjusting temperature of the neutralized solution, blowing hydrogen sulfide gas, obtaining the zinc removed precipitate and the zinc removed final solution, and then blowing hydrogen sulfide gas while adjusting temperature and pH of the zinc removed final solution; and to operate these steps, operation of a steam boiler or power generation facility and a hydrogen sulfide manufacturing plant is indispensible, and the one to be sent to the next step is easy to be transferred, and the nickel barren liquor not containing a precipitate is obtained.

Therefore, even when the coupling pipelines (10,11) having a valve of the present invention are installed, a serious trouble does not occur caused by installing the coupling pipeline, because transfer of a substance between each of the lines is only liquid and a solid substance is not contained.

The coupling pipeline is not especially limited as long as it has a size and a material endurable to be substances passing through, respectively, in view of flow amount and the material, however, it is preferable to be made of the same material as that of the liquid sending pipeline to which the relevant coupling pipeline is coupled. In addition, a valve is installed to cut off or adjust amount of liquid transferring inside this coupling pipeline, and a control valve is desirable, because the valve adjusts flow rate to be supplied. It is because, in the case where load of the step is limited by a trouble occurred, by adjusting amount comparable thereto using the control valve so as to supply it to other line, operation can be continued by minimizing decrease in throughput caused by the serious trouble, and also start-up can be made early, after eliminating the serious trouble.

In addition, it is preferable to install a flow meter for the similar purpose.

It should be noted that it is more efficient to install a plurality of lines at nearly the same position, in view of convenience of carrying the nickel laterite ore (raw material), carrying out the nickel-cobalt mixed sulfide (product) and the like.

2. An Operation Method in the Case Where a Serious Trouble Occurred.

Figure 2:
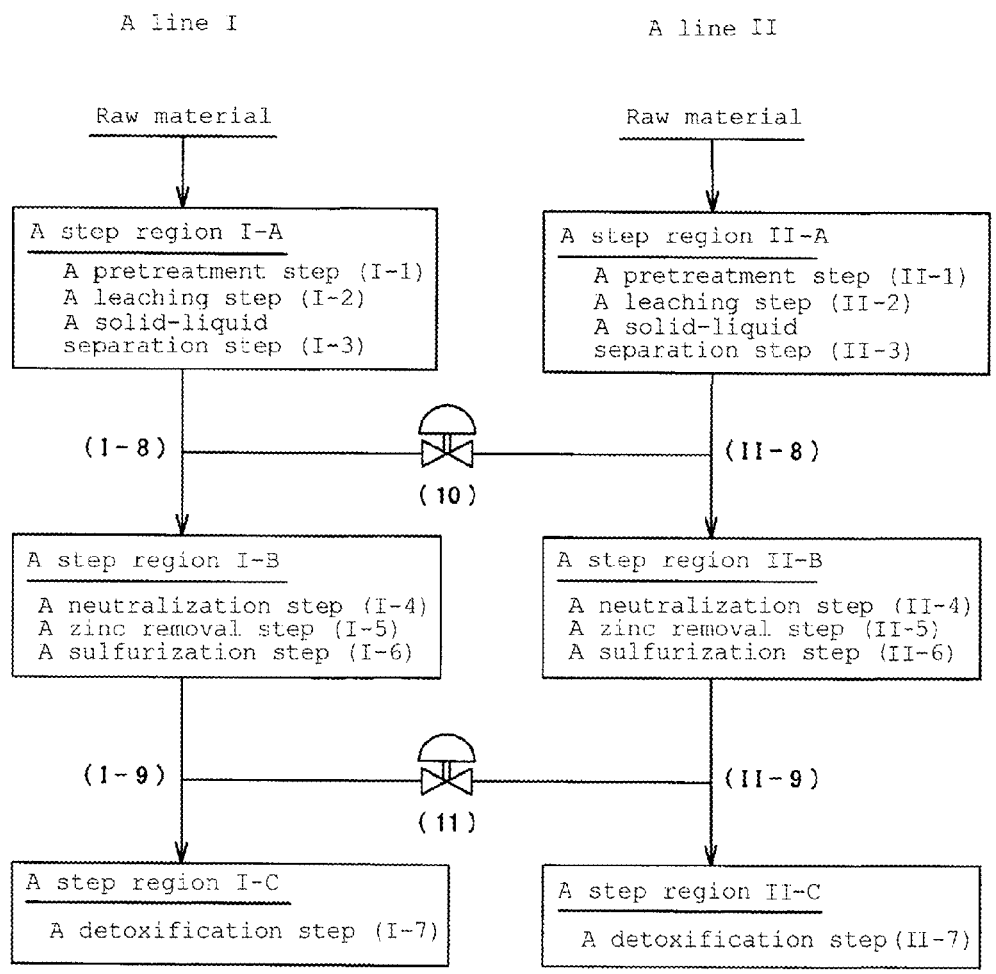
FIG. 2 is a schematic step drawing exemplifying a two line-type hydrometallurgical plant of the present invention by step regions.

Explanation will be given on the operation method in the case of having two lines, the line I and the line II, for convenience. It should be noted that explanation will be given on each step by grouping in the step regions, as shown in FIG. 2.

Now, in the case where a serious trouble will occur at any of the steps in the step region (I-A), and operation of the step region (I-A) should be stopped, by increasing throughput of the step region (II-A), and adjusting opening degree of the valve of a coupling pipeline (10), the crude nickel sulfate aqueous solution is flowed in the step regions (I-B) and (II-B), and also in the emergency storing tank, as needed. In this way, facilities of the step region (I-B) and the step region (I-C) of the line I, and each facility of the line II are resulted in not to be stopped.

In addition, in the case where a serious trouble will occur at any of the steps in the step region (I-B), and operation of the step region (I-B) should be stopped, by increasing throughput of the step region (II-B), decreasing throughput of the step region (I-A) and/or the step region (II-A) down to comparable throughput of the step region (II-B) at the maximum, and adjusting opening degree of the valve of a coupling pipeline (10), crude nickel sulfate from the step region (I-A) and the crude nickel sulfate aqueous solution from the step region (II-A) are flowed in the step region (II-B), and also in the emergency storing tank, as needed. In addition, by adjusting opening degree of the valve of a coupling pipeline (11), the nickel barren liquor is distributed to the step regions (I-C) and (II-C). In this way, facilities of the step region (I-A) and the step region (I-C) of the line I, and each facility of the line II are resulted in not to be stopped.

In addition, in the case where a serious trouble will occur at any of the steps in the step region (I-C), and operation of the step region (I-C) should be stopped, by increasing throughput of the step region (II-C), decreasing throughput of the step region (I-A) and/or the step region (II-A) down to comparable throughput of the step region (II-C), and adjusting opening degree of the valve of a coupling pipeline (11), the nickel barren liquor from step region (I-B) and the nickel barren liquor from step region (II-B) are flowed in the step regions (II-C).

In addition, in the case where the step region (I-A) and the step region (II-B) are stopped caused by occurrence of a serious trouble, by increasing throughput of the step region (II-A) and the step region (I-B), the crude nickel sulfate aqueous solution from the step region (II-A) is flowed in the step region (I-B) by the coupling pipeline (10), and by adjusting opening degree of the valve of a coupling pipeline (11), the nickel barren liquor from step region (I-B) is distributed to the step regions (I-C) and the step regions (II-C).

In addition, in the case where the step region (I-A) and the step region (II-C) are stopped caused by occurrence of a serious trouble, by increasing throughput of the step region (II-A) and the step region (I-C), and by opening the valve of a coupling pipeline (10), the crude nickel sulfate from the step region (II-A) is distributed to the step regions (I-B) and the step regions (II-B), and by opening opening the valve of a coupling pipeline (11), the nickel barren liquor from the step region (I-B) and the step region (II-B) is flowed in the step region (I-C).

In this way, time required for start-up after elimination of the trouble can be shortened, by continuous operation of facilities of the step region not related to the serious trouble, as well as minimizing reduced production amount caused by trouble generation.

It should be noted that explanation was given above using the case of the two lines, however, situation is similar also in the case of the three lines or more. The more line numbers provides the smaller excess load amount per facility, loaded onto the facility of the step region to be subjected to increased production, and thus is preferable.

As is clear from the above, the present invention is not limited to the hydrometallurgical plant of the nickel laterite ore, and it is applicable also to other plants accompanying generation of slurry containing hard particles or such a precipitate that easily adhere onto an facility surface, and as for the number of lines to be installed in that case, an optimal range is decided from an aspect of performance of various kinds of plants, production scale, cost, environmental problems, operation staffs, or the like.

EXAMPLES

Explanation will be given below on the present invention in further detail with reference to Examples of the present invention, however, the present invention should not be limited to these Examples.

Example 1

Six months of operation was performed using a plant of the present invention shown in FIG. 2. During this operation period, 20 times (240 hours) in total of troubles occurred in the step region (II-A). Among these, stopping time (including shut-down and start-up) was 20 hours in three times, 48 hours in one time and 72 hours in one time, and all of them were serious troubles. In addition, troubles of 15 times other than these were handled within 2 to 8 hours, and were able to deal with by utilization of the emergency storage tank.

For the period when the step region (II-A) was stopped in the 5 times of the serious troubles, it was able to deal with by adjusting operation load in the step region (I-A) to 120%, supplying liquid from the step region (I-A) to the step region (I-B) using the valve (10), and adjusting operation load in the step region (I-B), the step region (I-C) and the step region (II-B) to 60%.

That is, production of the nickel-cobalt mixed sulfide manufactured during elimination time of the serious troubles of these five times (180 hours) was able to be continued under a load of 120%, as compared with steady (100%) operation of usual one line only. In addition, non-standard products (repeatedly processed products) were not generated, and because only three steps were stopped among the total seven steps of the line II, man-hour required up to entering normal operation by the two lines was only nearly half of man-hour required in start-up after the whole stoppage.

It should be noted that, in the case where the whole line II was stopped as in conventional system, operation was stopped for at least 240 hours or longer (including shut-down and start-up), caused by these 5 times of troubles, and production of the nickel-cobalt mixed sulfide was attained in the line I only. From these facts, it is considered that enhancement of rate of operation at least equivalent to two days (=+20%× 240 hours÷24 hours/day) was possible, in the shut-down of the line II for 8.3 days, as compared with a conventional method.

That is, production of the nickel-cobalt mixed sulfide manufactured during elimination time of the serious troubles of these five times (180 hours) was able to be continued under a load of 120%, as compared with steady (100%) operation of usual one line only. In addition, non-standard products (repeatedly processed products) were not generate, and because only three steps were stopped among the total seven steps of the line II, man-hour required up to entering normal operation by the two lines was only nearly half of man-hour required in start-up after the whole stoppage.

Example 2

In addition, during three months of operation period different from Example 1, 2 times (80 hours) in total of troubles occurred in the step region (I-B). Among these, stopping time (including shut-down and start-up) was 72 hours in one time, and it was a serious trouble. In addition, other trouble was continued for 8 hours, and was able to deal with by utilization of the emergency storage tank.

For the period when the step region (I-B) was stopped in the serious trouble, by adjusting operation load in the step region (I-A) and the step region (II-A) to 70%, supplying liquid from the step region (I-A) to the step region (II-A) using the valve (10), and operation of the step region (II-B) was continued under an operation load of 60%. In addition, by supplying liquid from the step region (II-B) to the step region (I-B) under an operation load of 60%, using the valve (11), the step region (I-C) and the step region (II-C) were adjusted to an operation load of 60%. In addition, as for a period (72 hours) when the step region (II-B) was in an excess supply state, in view of capability, it was able to deal with by the emergency storage tank for a solution containing nickel and cobalt equivalent to an operation load of 20%.

Comparative Example 1

Six months of operation was performed in the stage before coupling the coupling pipelines (1) and (2) in the plant of the present invention. During this operation period, 15 times (200 hours) in total of troubles occurred in the step region (II-A). Among these, stopping time (including rate down and start-up time) was 20 hours in one time, 24 hours in one time and 48 hours in two times, and all of them were serious troubles, therefore operation of II-A should be stopped. In addition, troubles of 11 times other than these were handled within 2 to 8 hours, and were able to deal with by utilization of the emergency storage tank, without requiring operation stop.

In the four times (140 hours) of serious troubles, operation of the whole line II was stopped, production of the nickel-cobalt mixed sulfide was impossible, and only the line I was operated. Because total seven steps stopped in the line II was all required to start-up, man-hour required in start-up to normal operation, after elimination of the serious troubles was about two times man-hour required in Example 1.

In addition, non-standard products, in an amount equivalent to 12% of the repeatedly processed products in normal operation, were generated by operation stop, and it was subjected to repeated treatment into the line afterwards.

Industrial Applicability

The present invention is applicable, without limiting to the hydrometallurgical plant of the nickel laterite ore, also to a plant handling slurry containing hard particles, or accompanying generation of a precipitate easy to adhere at the facility surface.

Reference Signs List
(1) A pretreatment step,
(2) A leaching step
(3) A solid-liquid separation step
(4) A neutralization step
(5) A zinc removal step
(6) A sulfurization step
(7) A detoxification step
(I-1) A pretreatment step of line I
(II-1) A pretreatment step of line II
(I-2) A leaching step of line I
(II-2) A leaching step of line II
(I-3) A solid-liquid separation step of line I
(II-3) A solid-liquid separation step of line II
(I-4) A neutralization step of line I
(II-4) A neutralization step of line II
(I-5) A zinc removal step of line I
(II-5) A zinc removal step of line II
(I-6) A sulfurization step of line I
(II-6) A sulfurization step of line II
(I-7) A detoxification step of line I
(II-7) A detoxification step of line II
(I-8) A liquid sending pipeline of line I
(II-8) A liquid sending pipeline of line II
(I-9) A liquid sending pipeline of line I
(II-9) A liquid sending pipeline of line II
(10) A coupling pipeline
(11) A coupling pipeline
(I-A) Step region A of line I
(II-A) Step region A of line II
(I-B) Step region B of line I
(II-B) Step region B of line II
(I-C) Step region C of line I
(II-C) Step region C of line II

The invention claimed is:

1. A hydrometallurgical plant of a nickel laterite ore comprising;
two or more lines of a series of treatment facilities,
wherein the treatment facilities consist of a pretreatment step, a leaching step, a solid-liquid separation step, a neutralization step, a zinc removal step, a sulfurization step and a detoxification step, and
wherein the lines are coupled by installing a first coupling pipeline having a first valve positioned after the solid-liquid separation step in the lines and a second coupling pipeline having a second valve positioned after the sulfurization step in the lines;
wherein the first coupling pipeline transfers a liquid from the solid-liquid separation step to the neutralization step between each line and the second coupling pipeline transfers a liquid from the sulfurization step to the detoxification step between each line
wherein the transfer from the solid-liquid separation step to the neutralization step consists only of the liquid from the solid-liquid separation step, and
wherein the transfer from the sulfurization step to the detoxification step consists only of the liquid from the sulfurization step.

2. The hydrometallurgical plant of the nickel laterite ore according to claim 1, wherein the lines of treatment facilities have about the same processing capacity.

3. The hydrometallurgical plant of the nickel laterite ore according to claim 1, wherein the number of lines is 2.

4. The hydrometallurgical plant of the nickel laterite ore according to claim 1, wherein the first valve and the second valve are a control valve.

5. An operation method for the hydrometallurgical plant of the nickel laterite ore according to claim 1, comprising:
   stopping the operation of a region of the treatment facilities, wherein said region consists of one or more of the steps of the treatment facilities, when step in said region fails to perform treatment, and then
   adjusting the first valve of the first coupling pipeline and/or the second valve of the second coupling pipeline so as to by-pass said region.

6. The operation method according to claim 5, wherein the lines of treatment facilities have about the same processing capacity.

7. The operation method according to claim 5, wherein the number of lines is 2.

8. The operation method according to claim 5, wherein the first valve and the second valve are a control valve.

9. The hydrometallurgical plant of the nickel laterite ore according to claim 1, wherein the series of treatment facilities are performed in the following order: the pretreatment step, the leaching step, the solid-liquid separation step, the neutralization step, the zinc removal step, the sulfurization step and the detoxification step.

10. The hydrometallurgical plant of the nickel laterite ore according to claim 1, wherein the number of lines is 3.

11. The operation method according to claim 5, wherein the series of treatment facilities are performed in the following order: the pretreatment step, the leaching step, the solid-liquid separation step, the neutralization step, the zinc removal step, the sulfurization step and the detoxification step.

12. The operation method according to claim 5, wherein the number of lines is 3.

13. The operation method according to claim 5, wherein the region stopped consists of the pretreatment step, the leaching step and the solid-liquid separation step.

14. The operation method according to claim 13, wherein the first valve is opened.

15. The operation method according to claim 5, wherein the region stopped consists of the neutralization step, the zinc removal step and the sulfurization step.

16. The operation method according to claim 15, wherein the first valve and the second valve are opened.

17. The operation method according to claim 5, wherein the region stopped consists of the detoxication step.

18. The operation method according to claim 17, wherein the second valve is opened.

* * * * *